United States Patent
Ionasec et al.

(10) Patent No.: US 9,196,049 B2
(45) Date of Patent: Nov. 24, 2015

(54) METHOD AND SYSTEM FOR REGRESSION-BASED 4D MITRAL VALVE SEGMENTATION FROM 2D+T MAGNETIC RESONANCE IMAGING SLICES

(75) Inventors: Razvan Ioan Ionasec, Lawrenceville, NJ (US); Dime Vitanovski, Erlangen (DE); Alexey Tsymbal, Erlangen (DE); Gareth Funka-Lea, Cranbury, NJ (US); Dorin Comaniciu, Princeton Junction, NJ (US); Andreas Greiser, Erlangen (DE); Edgar Mueller, Heroldsbach (DE)

(73) Assignee: Siemens Aktiengesellschaft, Munich (DE)

(*) Notice: Subject to any disclaimer, the term of this patent is extended or adjusted under 35 U.S.C. 154(b) by 510 days.

(21) Appl. No.: 13/416,168

(22) Filed: Mar. 9, 2012

(65) Prior Publication Data

US 2012/0232379 A1     Sep. 13, 2012

Related U.S. Application Data

(60) Provisional application No. 61/451,025, filed on Mar. 9, 2011.

(51) Int. Cl.
*A61B 5/055* (2006.01)
*G06T 7/00* (2006.01)

(52) U.S. Cl.
CPC ..... *G06T 7/0083* (2013.01); *G06T 2207/10088* (2013.01); *G06T 2207/20076* (2013.01); *G06T 2207/20081* (2013.01); *G06T 2207/30048* (2013.01)

(58) Field of Classification Search
CPC ....................................................... A61B 5/055
USPC ................................................... 600/407, 410
See application file for complete search history.

(56) References Cited

U.S. PATENT DOCUMENTS

| | | | |
|---|---|---|---|
| 7,689,261 B2 * | 3/2010 | Mohr et al. | 600/407 |
| 7,693,563 B2 * | 4/2010 | Suresh et al. | 600/407 |
| 7,916,919 B2 | 3/2011 | Zheng et al. | |
| 2009/0310837 A1 | 12/2009 | Park et al. | |
| 2010/0280352 A1 * | 11/2010 | Ionasec et al. | 600/407 |
| 2011/0319763 A1 | 12/2011 | Subramanian et al. | |
| 2012/0022843 A1 | 1/2012 | Ionasec et al. | |

* cited by examiner

*Primary Examiner* — Peter Luong

(57) ABSTRACT

A system and method for regression-based segmentation of the mitral valve in 2D+t cardiac magnetic resonance (CMR) slices is disclosed. The 2D+t CMR slices are acquired according to a mitral valve-specific acquisition protocol introduced herein. A set of mitral valve landmarks is detected in each 2D CMR slice and mitral valve contours are estimated in each 2D CMR slice based on the detected landmarks. A full mitral valve model is reconstructed from the mitral valve contours estimated in the 2D CMR slices using a trained regression model. Each 2D CMR slice may be a cine image acquired over a full cardiac cycle. In this case, the segmentation method reconstructs a patient-specific 4D dynamic mitral valve model from the 2D+t CMR image data.

37 Claims, 4 Drawing Sheets

METHOD AND SYSTEM FOR REGRESSION-BASED 4D MITRAL VALVE SEGMENTATION FROM 2D+T MAGNETIC RESONANCE IMAGING SLICES

This application claims the benefit of U.S. Provisional Application No. 61/451,025, filed Mar. 9, 2011, the disclosure of which is herein incorporated by reference.

BACKGROUND OF THE INVENTION

The present invention relates to cardiac magnetic resonance (MR) imaging, and more particularly, to 4D mitral valve segmentation from 2D+t MR slices.

Cardiac MR imaging (CMR) has recently emerged as the new gold standard for characterizing cardiac masses and evaluating cardiac function and anatomy. The multi-plan ability of CMR to acquire tomographic images in any plane, the capability to measure blood flow velocity in all three dimensions within a single slice, and the use of non-ionizing radiation are significant advantages of CMR over other imaging modalities. Clinical studies have proven that CMR is well suited for the complex evaluation of the mitral valve by comparing mitral valve measurements extracted from CMR data with those extracted from computed tomography (CT) data and ultrasound (US) data. However, the 2D slice based acquisition of CMR limits the capabilities for accurate 4D anatomical and functional analysis of the heart due to long throughput times and the need for protracted study.

Although many groups have studied 4D heart chamber acquisition and segmentation, with a focus on the left ventricle, to overcome the 2D acquisition limitations of CMR, there is still no established acquisition protocol for extracting 4D anatomical and function information regarding the heart valves. Furthermore, while there is ongoing work in the field of heart chamber segmentation, there has been less research on extracting the heart valves from CMR data, which is difficult due to the acquisition limitations of CMR and the complexity of the heart valves.

BRIEF SUMMARY OF THE INVENTION

The present invention provides a method and system for 4D mitral valve segmentation from 2D+t magnetic resonance imaging (MRI) slices. Embodiments of the present invention provide a novel cardiac magnetic resonance (CMR) acquisition protocol for non-invasive assessment of the mitral valve anatomy and morphology. Embodiments of the present invention further provide a regression-based method for a patient-specific 4D mitral valve model estimation. Embodiments of the present invention further provide a method for learning a regression-model from data acquired from different imaging modalities (CT-MRI, US-MRI) for a patient-specific 4D mitral valve model estimation.

In one embodiment of the present invention, a plurality of 2D+t CMR slices are acquired using a mitral valve-specific acquisition protocol. A set of mitral valve landmarks is detected in each 2D CMR slice and mitral valve contours are estimated in each 2D CMR slice based on the detected landmarks. A full mitral valve model is reconstructed from the mitral valve contours estimated in the 2D CMR slices using a trained regression model. Each 2D CMR slice may be a cine image acquired over a full cardiac cycle. In this case, the segmentation method reconstructs a patient-specific 4D dynamic mitral valve model from the 2D+t CMR image data.

These and other advantages of the invention will be apparent to those of ordinary skill in the art by reference to the following detailed description and the accompanying drawings.

DETAILED DESCRIPTION

Figure 1:
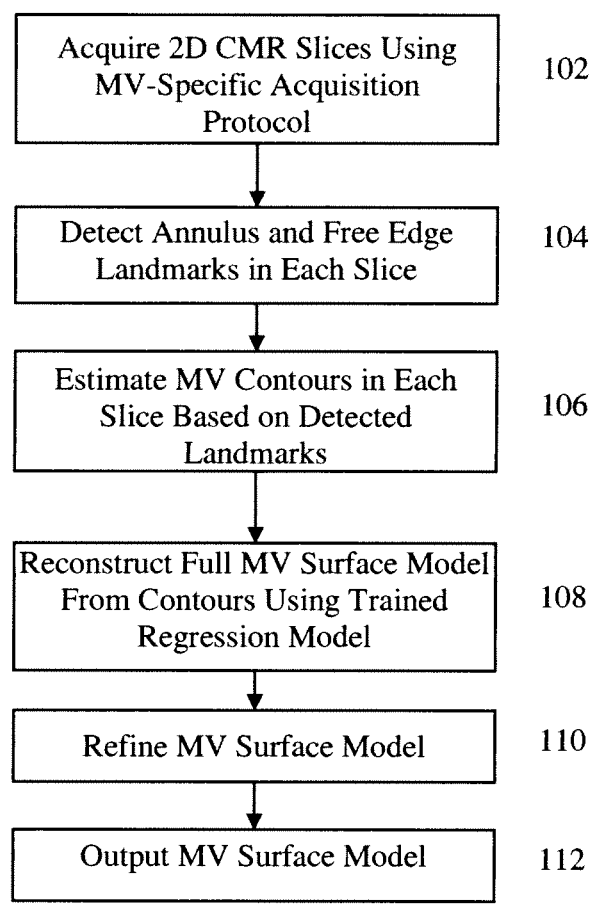
FIG. 1 illustrates a method of regression-based mitral valve segmentation from 2D CMR slices according to an embodiment of the present invention.

The present invention relates to regression-based segmentation of the mitral valve (MV) from 2D+t magnetic resonance (MR) images. Embodiments of the present invention are described herein to give a visual understanding of the mitral valve segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

In order to accurately reconstruct the surface of the MV from incomplete data, embodiments of the present invention introduce a regression-based method for segmenting a complete MV surface model. In particular, a set of 3D points belonging to the MV in the sparse data of acquired 2D+t cardiac magnetic resonance (CMR) slices are input, and a full MV surface mesh is output using a regression model learned from a training set of complete annotated MV surfaces. Component regressors of the regression model are learned using additive boosting regression on a set of descriptors representing the cloud of points belonging to the MV, and the learned component regressors are able to accurately restore the complete MV surface from the sparse representation of MV points in the 2D CMR slices.

In contrast to active shape model (ASM)-based methods, regression-based solutions make no implicit assumption about multivariate normality of the data. As compared to simpler heart anatomies, such as the left and right ventricles, the complex structure of the MV exhibits higher variability and a larger variance of mesh point distributions and is therefore more challenging to segment, especially from sparse data. Accordingly, segmentation of the MV from sparse 2D+t CMR data requires a robust segmentation technique.

In training a regression model, a solution to the following optimization problem is typically sought:

$$\hat{R}(x) = \operatorname{argmin}_{R \in \mathfrak{I}} \sum_{n=1}^{N} L(y(x_n), R(x_n))/N \qquad (1)$$

where $\mathfrak{I}$ is the set of possible regression functions, L(o,o) is a loss function that penalizes the deviation of the regressor output $R(x_n)$ from the true output $y(x_n)$, and N is the number of available training examples. In an embodiment of the present invention, the reconstruction task is defined as a regression problem between a full surface (mesh) model of the MV and the respective sparse data acquired using the CMR described herein. This regression problem can be expressed as:

$$y_{surface} = \hat{R}(x_{sparse}) + \epsilon. \qquad (2)$$

In an advantageous implementation, the focus of this regression problem, both for input and output, is in shape information, and the respective volume data is ignored. Thus, the output $y_{surface}$ is a set of m 3D points defining the MV surface:

$$y_{surface} = ((x_1, y_1, z_1), \ldots, (x_m, y_m, z_m))^T. \qquad (3)$$

The input $x_{sparse}$ are shape descriptors describing a cloud of points belonging to the MV in the sparse CMR data. On possible implementation is to use the coordinates of known points as input. However, a drawback of using coordinates of known points as input is that it is necessary to provide point correspondence, which is not always feasible, especially for data with high variability, such as the MV surface. Alternatively, an advantageous embodiment of the present invention uses point number and point correspondence-invariant point cloud descriptors, such as:

A3: Measures the angle between three random points;
D2: Measures the distance between two random points; and
D3: Measures the square root of the area of the triangle between three random points.

Other shape descriptors may be incorporated into the regression model instead of or in addition to the above listed shaped descriptors, including the relative occurrence frequencies in the histogram bins and a number (e.g., the first four) central moments describing the histogram distribution of a selected feature. A histogram is constructed for each descriptor type, in order to characterize the distribution of a specific feature (e.g., angle, distance or area) formed by a random sample from the initial cloud of points. These descriptors are translation and rotation-invariant, while A3 is also scale invariant.

The regression model is trained (learned) based on annotated training data. In particular, a number of annotated MV surface models in training images and respective sparse data points belonging to the MV surface models are input to the training algorithm and used to train the regression model. According to an embodiment of the present invention, the regression function may be trained using training images from MV models manually or automatically detected in other imaging modalities, such as CT and US. In this case, simulated sparse images from the CT data and/or the US data are used to generate training samples for the sparse point clouds belonging to the MV models. The invariant shape descriptors are calculated from the sparse point cloud training samples, and the regression model is trained from these shape descriptions and the respective MV models. The training MV surface models can include MV surface models at multiple cardiac phases. Accordingly, the trained regression model will be capable of segmenting the MV at all cardiac phases in order to provide 4D MV segmentation.

In order to train the regression model, each component regression problem $\hat{R}^j$ is solved by learning using additive boosting regression (ABR). In ABR, weak regressors $\rho_t$ are sequentially fit to residuals, starting from the mean $\bar{y}$ and proceeding with the residuals of the available set of weak regressors themselves. In ABR, the output function is assumed to take a linear form as follows:

$$\hat{R}(x) = \sum_{t=1}^{T} \alpha_t \rho_t(x); \qquad (4)$$

$$\rho_t(x) \in \mathfrak{I}$$

where $p_t(x)$ is a base (weak) learner and T is the number of boosting iterations.

According to an advantageous implementation, extremely simple weak regressors can be used as the base learners. Such weak regressors include simple 1D linear regression (SLR), logistic stumps (LS), and decision stumps (DS). For SLR, at each boosting iteration, a feature which results in the smallest squared loss with linear regression is added to the pool of selected features. Each weak learner is thus a simple linear regressor of the form $y = \beta_1 x + \beta_0$, where x is the selected shape descriptor and y is a scalar output coordinate. LS is a simple logistic function on one shape descriptor x:

$$y = \frac{1}{1 + e^{-z}}, \qquad (5)$$

$$z = \beta_1 x + \beta_0.$$

DS is a piecewise linear threshold function where a threshold $\theta$ is selected so that the variance in the subsets of instances produced is minimized. It is important to note that SLR results in a linear solution overall, while DS and LS result in non-linear solutions.

Solution stabilization can be achieved by injecting randomization in the input data using a bagging with random feature sub-sampling (BRFS) framework. This improves the generalization performance of the underlying regression model and helps to avoid overfitting the regression model to noise and peculiarities in the training data. In particular, instead of providing a single model R for the training set X, a set of models $R_i^j$ is generated, each learned using the same additive regression procedure, but on a random sample of the training data with instances $S_i$ obtained using random sampling with replacement, and a subset of features $F_j$ including 50% features randomly sampled without replacement from the original set. When applying the trained set of regression models to segment the MV surface, the final solution is determined as the mean surface for the surfaces obtained with the regression models trained from the random samples: $R = \operatorname{mean}_{i,j}(R_i^j)$.

FIG. 1 illustrates a method of regression-based MV segmentation from 2D CMR slices according to an embodiment of the present invention. As illustrated in FIG. 1, at step 102, 2D CMR slices are obtained using an MV-specific acquisition protocol. According to an embodiment of the present invention, the acquisition protocol can defined a plurality of parallel slices perpendicular to the MV annulus in at least one scout image. In advantageous implementation, six parallel slices may be acquired.

The MR valve imaging plane can be defined by acquiring four-chamber, three-chamber, and short-axis view scout images in the diastolic phase of the cardiac cycle. The phase of the cardiac cycle can be associated with images acquired by an MR scanning device using electrocardiograph (ECG) gating. Initial orientation of the imaging plane is given by the short-axis view, where the plane passes through the MV commissures. The MV annulus can be manually or automatically identified in the four-scout images, and a plurality of parallel slices perpendicular to the MV annulus in the short-axis view can be defined. The plurality of parallel slices can then be acquired using an MR scanning device.

In a possible implementation, each slice of the plurality of 2D CMR slices can be acquired as an MR cine image (i.e., a temporal sequence of MR images) covering a full cardiac cycle. The full cardiac cycle can be covered using a retrospectively/prospectively gate ECG signal. In this case, each frame of a slice sequence may be grouped with frames of the other parallel slice sequences in the same cardiac phase, resulting in a respective set of parallel 2D CMR slices for each cardiac phase of the cardiac cycle. Regression-base segmentation (described in greater detail in steps 104-110) can then be performed to reconstruct a separate MV surface model for each cardiac phase from the respective set of 2D CMR slices corresponding to the cardiac phase.

Figure 2:
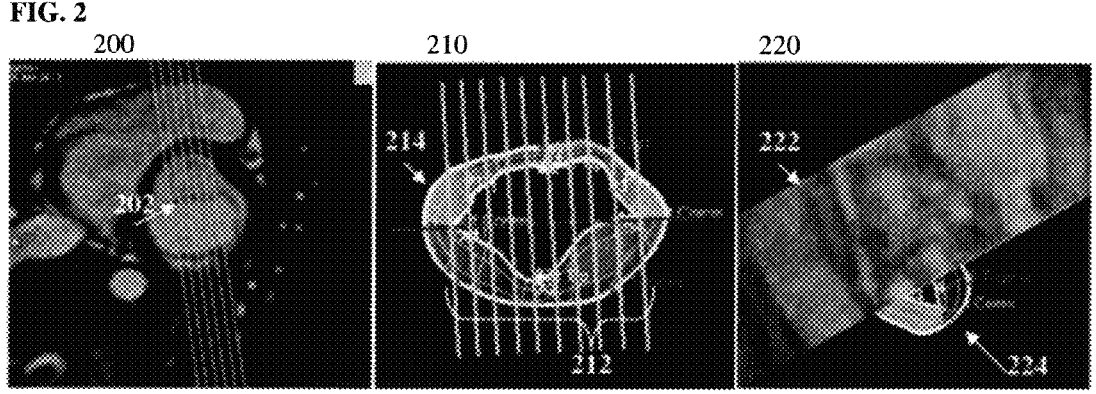
FIG. 2 illustrates the mitral valve-specific acquisition protocol according to an embodiment of the present invention.

FIG. 2 illustrates the MV-specific acquisition protocol according to an embodiment of the present invention. As illustrated in FIG. 2, image 200 shows the orientation of six parallel scanning planes 202 in a short axis view for acquiring the parallel 2D CMR slices. Image 210 provides a view showing the orientation of parallel scanning planes 212 for acquiring parallel 2D CMR slices with respect to an MV surface model 214 and image 220 provides a view showing the acquired parallel 2D CMR slices 222 with respect to an MV surface model 224.

Embodiments of the present invention provide an MV-specific acquisition protocol that the present inventors have defined based on extensive experiments on simulated data in order to find an advantageous trade-off between MV segmentation error and acquisition time. In the experiments, the regression-based MV segmentation of FIG. 1 was applied to segment the MV from simulated sparse images in the end-diastolic (ED) and end-systolic (ES) phases of the cardiac cycle. Table 1 illustrates shows segmentation error in the ED and ES phases and acquisition time resulting from a various number of planes (slices) being acquired.

mis-registration characteristic for such an acquisition protocol, a stack of parallel planes may be more appropriate for MV segmentation.

Figure 3:
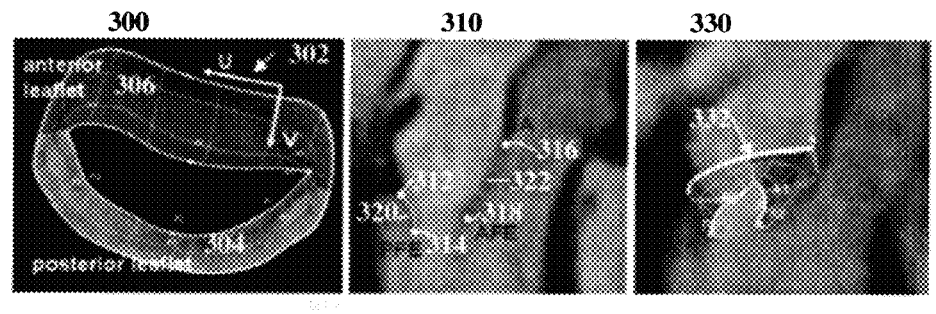
FIG. 3 illustrates a mitral valve surface model, landmark detection and contour estimation results, and mitral valve surface model segmentation results.

Returning to FIG. 1, at step 104, annulus and free edge landmarks are detected in each 2D CMR slice. The MV, which is located between the left atrium and the left ventricle, includes a posterior leaflet, an anterior leaflet, an annulus, a free edge, and subvalvular apparatus. The posterior leaflet can be defined by the posterior leaflet tip, posterior and anterior commissures, and the posterior annular midpoint, and the anterior leaflet can be defined by the anterior leaflet tip, the left and right trigones, and the two commissures. FIG. 3 illustrates an MV surface model, landmark detection and contour estimation results, and MV surface model segmentation results. Image 300 of FIG. 3 shows an MV surface model 302, which is a point distribution model used to represent the mitral valve surfaces S of the posterior leaflet 304 and the anterior leaflet 306 in the u and v directions $$(S_{posterior}(u,v)=(31,17), S_{anterior}(u,v)=(27,17)).$$

The following MV landmarks are detected in each 2D CMR slice: a posterior annulus (PA) landmark, a posterior free edge (PFE) landmark, an anterior annulus (AA) landmark, and an anterior free edge (AFE) landmark. The landmarks define a joint context landmark set between the posterior annulus and posterior free edge landmarks (PA, PFE) and the anterior annulus and anterior free edge landmarks (AA, AFE). The landmark detection using the defined joint context can be performed in three stages. In the first stage, candidates for each of the landmarks (PA, PFE, AA, and AFE) are independently detected in each 2D CMR slice using a separate trained 2D landmark classifier for each landmark. The landmark classifiers can be trained from annotated training data using a probabilistic boosting tree (PBT) and 2D Haar-like features. The trained landmark classifier for each landmark detects a probability for each pixel in the slice to represent a landmark. The top M candidates with the highest probabilities can be selected for each of the annulus landmarks (PA and AA) and the top N candidates with the highest probabilities can be selected for each of the free edge landmarks (PFE and AFE).

In the second stage, a set of joint context candidates are generated in each 2D MR slice from all possible combinations of the landmark candidates. The joint context candidates can be generated from all possible candidate pairs of <annulus plane, free edge plane>, where a set of annulus plane candidates are generated from all possible pairs of the

TABLE 1

| | MRI Protocol definition | | | | | | | | |
|---|---|---|---|---|---|---|---|---|---|
| No. Planes | 2 | 3 | 4 | 5 | 6 | 7 | 8 | 9 | 10 |
| ED | 6.7 ± 1.1 | 5.6 ± 1.0 | 4.4 ± 0.9 | 3.5 ± 0.68 | 3.1 ± 1.1 | 2.6 ± 1.0 | 2.3 ± 1.0 | 2.1 ± 1.0 | 1.8 ± 0.86 |
| ES | 2.9 ± 1.2 | 2.6 ± 2.2 | 2.2 ± 1.5 | 2.1 ± 1.4 | 2.1 ± 1.2 | 2.3 ± 1.6 | 2.5 ± 2.3 | 2.1 ± 1.1 | 1.9 ± 1.0 |
| acq. time | 3.16 min | 3.24 min | 3.32 min | 3.40 min | 3.48 min | 3.56 min | 3.64 min | 3.72 min | 3.80 min |

Based on the results of the experiments on the simulated data, six parallel long axis (LA) planes are selected to provide an advantageous trade-off between MV segmentation error and acquisition time in an embodiment of the present invention, however the present invention is not limited thereto. Another possible acquisition protocol would be to have a number (e.g., 6) radial LA planes. However, due to the long acquisition planning time, complicated device settings, and the plane detected PA and AA candidates and a set of free edge plane candidates are generated from all possible pairs of PFE and AFE candidates.

In the third stage, a context operator C is applied to calculate Haar-like features from each of the joint context candidates and one of the joint context candidates is selected in each slice based on the calculated features using a trained joint context classifier. The joint context classifier is trained based on annotated training data, where positive training samples are given by ground truth annotations of the joint context in the training data and negative training samples are false joint contexts constructed using landmark candidates positively detected by the trained landmark classifiers. In particular, the joint context classifier can be trained using a PBT based on Haar-like features representing the positive and negative training samples. The trained joint-context classifier detects a probability score for each joint context candidate in each slice and the joint context classifier having the highest probability score in each slice is selected. The selected joint context in each slice provides the detected positions for all of the landmarks (PA, PFE, AA, and AFE) in the slice. Referring to FIG. 3, image 310 shows detected PA, PFE, AA, and AFE landmarks 302, 304, 306, and 308, respectively.

Returning to FIG. 1, at step 106, MV contours are estimated in each 2D CMR slice based on the detected landmarks. Each MV contour is a sets of points estimated to be on the MV surface in a 2D CMR slice. In one implementation, a posterior leaflet contour and an anterior leaflet contour are estimated in each slice. The posterior leaflet contour is a set of points estimated to be on a posterior leaflet surface in a slice and the anterior leaflet contour is a set of points estimated to be on the anterior leaflet surface in a slice. The contours are each parameterized by a predetermined number of discrete points (e.g., 17) and are initialized in each slice based on the detected landmarks in the slice. For example, the posterior leaflet contour can be initialized in a slice as a number of discrete points in a straight line between the detected PA and PFE landmarks in the slice. The anterior leaflet contour can be initialized in a slice as a number of discrete points in a straight line between the detected AA and AFE landmarks in the slice. Each contour can then be deformed by adjusting each contour along a normal direction to search for edges along the normals. Embodiments of the present invention provide a trained 2D contour detector to test a set of hypothesis along the anterior and posterior contour normals and move the contours towards the location with the highest probabilistic response. Referring to FIG. 3, image 310 shows a posterior leaflet contour 320 estimated based on the detected PA and PFE landmarks 312 and 314, respectively, and an anterior leaflet contour 322 estimated based on the detected AA and AFE landmarks 316 and 318, respectively.

Returning to FIG. 1, at step 108, a full MV surface model is reconstructed from the estimated MV contours in the set of 2D CMR slices using a trained regression model. Shape descriptions SD are computed from the detected landmarks and the detected contours in the 2D CMR slices, as described above. The shape descriptors are set as input data to the trained regression model, which estimates a full patient-specific 3D MV surface model:

$$S_{MV}=R(SD(\text{landmarks},\text{contours})). \quad (6)$$

The 3D MV surface model is a set of 3D points defining the surface of the MV. In the case in which the 2D CMR slices are cine images, the steps of 104, 106, 108, and 110 (described below) are performed on multiple sets of frames of the 2D CMR slices, each set of frames corresponding to a separate phase of the cardiac cycle, in order to estimate a MV surface model for each cardiac phase, resulting in a patient-specific dynamic (4D) MV surface model.

As described above an additive boosting regression (ABR) algorithm trains the regression model using weak regressors, such as SLR, LS, and DS. In an advantageous implementation, the regression model is trained by incorporating all three of these weak learners into the framework of bagging with random feature sub-sampling (BRFS). In this case, the trained regression model outputs a mean of the set of regression models generated using the BRFS framework. According to possible embodiment, the trained regression model may be trained using training data from a different imaging modality than magnetic resonance imaging, such as CT and US.

At step 110, the reconstructed MV model is transformed from the coordinates of the regression space into the patient-specific image space. The reconstructed MV model estimated by the trained regression model is a set of points defining the MV surface in the coordinates of the regression space. In one embodiment, iterative closest point (ICP) algorithm, least-square similarity estimation (LSSE) algorithm or thin-plate-splines (TPS) algorithm can be used to transform the reconstructed MV model from the regression space into the patient-specific image space. Referring to FIG. 3, image 330 shows a full MV surface model 332 reconstructed from the landmarks 312, 314, 316, and 318 and contours 320 and 322 shown in image 310 using a trained regression model.

Figure 4:
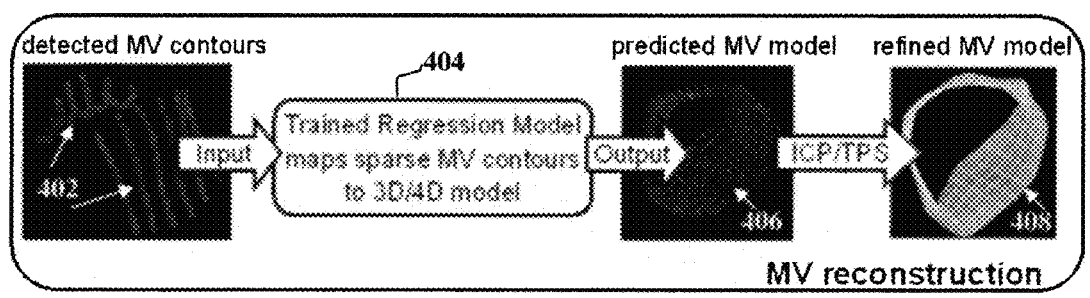
FIG. 4 illustrates the segmentation of a full surface model from a set of sparse contours.

FIG. 4 illustrates the segmentation of a full surface model from a set of sparse contours. As shown in FIG. 4, detected MV contours 402 from a set of six parallel 2D CMR slices are input to the trained regression model, which is conceptually illustrated in FIG. 4 as 404. The trained regression model 404 maps the sparse contours 402 to a 3D/4D model and outputs a predicted MV model 406. The predicted MV model 406 is a set of points defining the MV surface. The predicted MV model 406 is transformed using ICP/TPS/LSSE algorithms, resulting in a transformed MV model 408, which is an MV surface mesh.

Returning to FIG. 1, at step 112, the refined MV surface model is output. For example, the segmented MV surface model may be output by displaying the MV surface model on a display device of a computer system. It is also possible that the MV surface model may be output by storing the segmented MV surface model on a storage or memory of a computer system.

Figure 5:
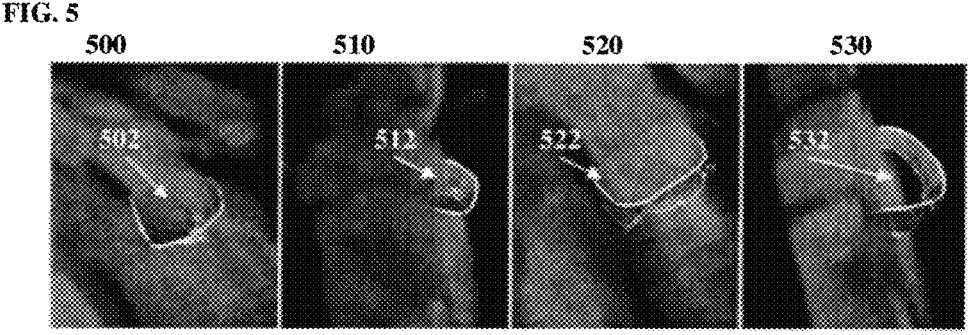
FIG. 5 illustrates exemplary mitral valve segmentation results using the regression-based mitral valve segmentation method of FIG. 1.

FIG. 5 illustrates exemplary MV segmentation results using the regression-based MV segmentation method of FIG. 1. Images 500 and 510 of FIG. 5 show a first segmented MV model 502 and 512 at the end-diastolic (ED) cardiac phase the end-systolic (ES) cardiac phase, respectively. Images 520 and 530 a second segmented MV model 522 and 532 at the ED cardiac phase and the ES cardiac phase, respectively.

Figure 6:
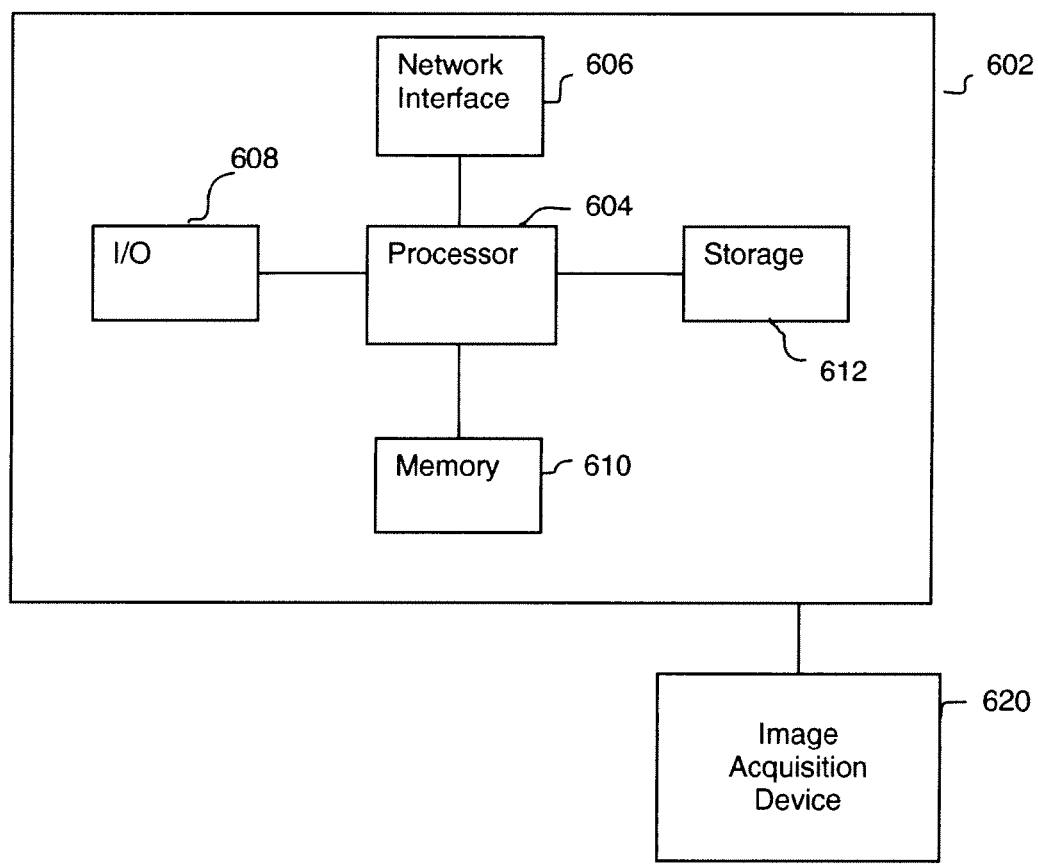
FIG. 6 is a high-level block diagram of a computer capable of implementing the present invention.

The above-described methods for regression-based segmentation of a mitral valve (MV) model, training a regression model, and determining a cardiac magnetic resonance (CMR) acquisition protocol may be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1 and 4 may be defined by the computer program instructions stored in the memory 610 and/or storage 612 and controlled by the processor 604 executing the computer program instructions. An image acquisition device 620, such as an MR scanning device, can be connected to the computer 602 to input image data to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of mitral valve segmentation from a plurality of 2D cardiac magnetic resonance (CMR) slices, comprising:
   detecting a set of mitral valve landmarks in each of the 2D CMR slices;
   estimating mitral valve contours in each of the 2D CMR slices based on the detected landmarks; and
   reconstructing a 3D mitral valve model from the mitral valve contours in the 2D CMR slices using a trained regression model.

2. The method of claim 1, further comprising:
   acquiring the plurality of 2D CMR slices according to a mitral-valve specific acquisition protocol.

3. The method of claim 2, wherein the step of acquiring the plurality of 2D CMR slices according to a mitral-valve specific acquisition protocol comprises:
   acquiring a plurality of parallel 2D CMR slices that are perpendicular to a mitral valve annulus.

4. The method of claim 2, wherein the step of acquiring the plurality of 2D CMR slices according to a mitral-valve specific acquisition protocol comprises:
   acquiring a plurality of radial 2D CMR slices.

5. The method of claim 2, wherein the step of acquiring the plurality of 2D CMR slices according to a mitral-valve specific acquisition protocol comprises:
   acquiring a short-axis-view scout image of a patient;
   detecting an initial mitral valve imaging plane passing through mitral valve commissures in the short-axis-view scout image;
   defining a plurality of parallel scanning planes that are perpendicular to a mitral valve annulus in the short-axis view scout image; and
   acquiring the plurality of 2D CMR slices by acquiring a 2D CMR in each of the plurality of parallel scanning planes.

6. The method of claim 2, wherein the step of acquiring the plurality of 2D CMR slices according to a mitral-valve specific acquisition protocol comprises:
   acquiring each of the plurality of 2D CMR slices in a respective one of a plurality of parallel scanning planes, wherein each 2D CMR slice is a cine sequence having a plurality of frames corresponding to a plurality of cardiac phases.

7. The method of claim 6, wherein:
   the step of detecting a set of mitral valve landmarks in each of the 2D CMR slices comprises detecting the set of mitral valve landmarks in each cardiac frame of each 2D CMR slice;
   the step of estimating mitral valve contours in each of the 2D CMR slices based on the detected landmarks comprises estimating the mitral valve contours in each frame of each 2D CMR slice; and
   the step of reconstructing a 3D mitral valve model from the mitral valve contours in the 2D CMR slices using a trained regression model comprises:
      for each of the plurality of cardiac phases, reconstructing a respective 3D mitral valve model from the estimated mitral valve contours in the corresponding frame of each of the 2D CMR slices using the trained regression function, resulting in a 4D dynamic mitral valve model.

8. The method of claim 1, wherein the step of detecting a set of mitral valve landmarks in each of the 2D CMR slices comprises:
   detecting a posterior annulus (PA) landmark, a posterior free edge (PFE) landmark, an anterior annulus (AA) landmark, and an anterior free edge (AFE) landmark in each 2D CMR slice.

9. The method of claim 8, wherein the step of detecting a posterior annulus (PA) landmark, a posterior free edge (PFE) landmark, an anterior annulus (AA) landmark, and an anterior free edge (AFE) landmark in each 2D CMR slice comprises, in each 2D CMR slice:
   independently detecting PA candidates, PFE candidates, AA candidates, and AFE candidates using respective trained landmark classifiers;
   generating a plurality of joint context candidates, the plurality of joint context candidates corresponding to all possible combinations of the PA, PFE, AA, and AFE candidates; and
   selecting one of the joint context candidates using a trained joint context classifier.

10. The method of claim 8, wherein the step of estimating mitral valve contours in each of the 2D CMR slices based on the detected landmarks comprises, in each 2D CMR slice:
   initializing a posterior leaflet contour as a number discrete contour points in a straight line between the detected PA and PFE landmarks;
   initializing an anterior leaflet contour as a number of discrete contour points in a straight line between the detected AA and AFE landmarks; and
   deforming the posterior leaflet contour and the anterior leaflet contour by adjusting the contour points of the posterior leaflet contour and the anterior leaflet contour in normal directions using a trained 2D contour detectors.

11. The method of claim 1, wherein the step of reconstructing a 3D mitral valve model from the mitral valve contours in the 2D CMR slices using a trained regression model comprises:
   calculating shape descriptors from the detected mitral valve landmarks and the estimated contours in the 2D CMR slices; and
   reconstructing the 3D mitral valve by the trained regression model based on the calculated shape descriptors.

12. The method of claim 1, wherein the trained regression model is trained based on annotated training data by additive boosting regression (ABR) using a plurality of weak regressors as base learners.

13. The method of claim 12, wherein the plurality of weak regressors are incorporated into a bagging with random feature sub-sampling (BRFS) framework.

14. The method of claim 1, wherein the trained regression model is trained based on annotated training data acquired by an imaging modality other than magnetic resonance imaging.

15. The method of claim 1, wherein the 3D mitral valve model reconstructed using the trained regression model comprises a set of points defining a surface of the mitral valve, and the method further comprises:
refining the 3D mitral valve model reconstructed using the trained regression model to fit a mesh to fit a mesh to the set of points defining the surface of the mitral valve.

16. An apparatus for mitral valve segmentation from a plurality of 2D cardiac magnetic resonance (CMR) slices, comprising:
a processor; and
a memory storing computer program instructions, which when executed by the processor cause the processor to perform operations comprising:
detecting a set of mitral valve landmarks in each of the 2D CMR slices;
estimating mitral valve contours in each of the 2D CMR slices based on the detected landmarks; and
reconstructing a 3D mitral valve model from the mitral valve contours in the 2D CMR slices using a trained regression model.

17. The apparatus of claim 16, wherein the operations further comprise:
acquiring the plurality of 2D CMR slices according to a mitral-valve specific acquisition protocol.

18. The apparatus of claim 17, wherein acquiring the plurality of 2D CMR slices according to a mitral-valve specific acquisition protocol comprises:
acquiring a plurality of parallel 2D CMR slices that are perpendicular to a mitral valve annulus.

19. The apparatus of claim 17, wherein acquiring the plurality of 2D CMR slices according to a mitral-valve specific acquisition protocol comprises:
acquiring each of the plurality of 2D CMR slices in a respective one of a plurality of parallel scanning planes, wherein each 2D CMR slice is a cine sequence having a plurality of frames corresponding to a plurality of cardiac phases.

20. The apparatus of claim 19, wherein:
detecting a set of mitral valve landmarks in each of the 2D CMR slices comprises detecting the set of mitral valve landmarks in each frame of each 2D CMR slice;
estimating mitral valve contours in each of the 2D CMR slices based on the detected landmarks comprises estimating the mitral valve contours in each frame of each 2D CMR slice; and
reconstructing a 3D mitral valve model from the mitral valve contours in the 2D CMR slices using a trained regression model comprises:
reconstructing a respective 3D mitral valve model for each of the plurality of cardiac phases from the estimated mitral valve contours in the corresponding frame of each of the 2D CMR slices using the trained regression function, resulting in a 4D dynamic mitral valve model.

21. The apparatus of claim 16, wherein detecting a set of mitral valve landmarks in each of the 2D CMR slices comprises:
detecting a posterior annulus (PA) landmark, a posterior free edge (PFE) landmark, an anterior annulus (AA) landmark, and an anterior free edge (AFE) landmark in each 2D CMR slice.

22. The apparatus of claim 21, wherein detecting a posterior annulus (PA) landmark, a posterior free edge (PFE) landmark, an anterior annulus (AA) landmark, and an anterior free edge (AFE) landmark in each 2D CMR slice comprises:
independently detecting PA candidates, PFE candidates, AA candidates, and AFE candidates using respective trained landmark classifiers;
generating a plurality of joint context candidates, the plurality of joint context candidates corresponding to all possible combinations of the PA, PFE, AA, and AFE candidates; and
selecting one of the joint context candidates using a trained joint context classifier.

23. The apparatus of claim 21, wherein estimating mitral valve contours in each of the 2D CMR slices based on the detected landmarks comprises:
initializing a posterior leaflet contour in a 2D CMR slice as a number discrete contour points in a straight line between the detected PA and PFE landmarks in the 2D CMR slice;
initializing an anterior leaflet contour in the 2D CMR slice as a number of discrete contour points in a straight line between the detected AA and AFE landmarks in the 2D CMR slice; and
deforming the posterior leaflet contour and the anterior leaflet contour.

24. The apparatus of claim 16, wherein reconstructing a 3D mitral valve model from the mitral valve contours in the 2D CMR slices using a trained regression model comprises:
calculating shape descriptors from the detected mitral valve landmarks and the estimated contours in the 2D CMR slices; and
reconstructing the 3D mitral valve by the trained regression model based on the calculated shape descriptors.

25. The apparatus of claim 16, wherein the operations further comprise:
training the trained regression model based on annotated training data by additive boosting regression (ABR) using a plurality of weak regressors as base learners.

26. The apparatus of claim 25, wherein training the trained regression model based on annotated training data by additive boosting regression (ABR) using a plurality of weak regressors as base learners comprises:
training the trained regression model based on annotated training data acquired by an imaging modality other than magnetic resonance imaging.

27. The apparatus of claim 16, wherein the 3D mitral valve model reconstructed using the trained regression model comprises a set of points defining a surface of the mitral valve, and the operations further comprise:
refining the 3D mitral valve model reconstructed using the trained regression model to fit a mesh to fit a mesh to the set of points defining the surface of the mitral valve.

28. A non-transitory computer readable medium encoded with computer executable instructions for mitral valve segmentation from a plurality of 2D cardiac magnetic resonance (CMR) slices, the computer executable instructions defining a method comprising:
detecting a set of mitral valve landmarks in each of the 2D CMR slices;

estimating mitral valve contours in each of the 2D CMR slices based on the detected landmarks; and reconstructing a 3D mitral valve model from the mitral valve contours in the 2D CMR slices using a trained regression model.

29. The non-transitory computer readable medium of claim 28, wherein the further comprises:

acquiring the plurality of 2D CMR slices according to a mitral-valve specific acquisition protocol.

30. The non-transitory computer readable medium of claim 29, wherein the step of acquiring the plurality of 2D CMR slices according to a mitral-valve specific acquisition protocol comprises:

acquiring a plurality of parallel 2D CMR slices that are perpendicular to a mitral valve annulus.

31. The non-transitory computer readable medium of claim 29, wherein the step of acquiring the plurality of 2D CMR slices according to a mitral-valve specific acquisition protocol comprises:

acquiring each of the plurality of 2D CMR slices in a respective one of a plurality of parallel scanning planes, wherein each 2D CMR slice is a cine sequence having a plurality of frames corresponding to a plurality of cardiac phases.

32. The non-transitory computer readable medium of claim 31, wherein:

the step of detecting a set of mitral valve landmarks in each of the 2D CMR slices comprises detecting the set of mitral valve landmarks in each frame of each 2D CMR slice;

the step of estimating mitral valve contours in each of the 2D CMR slices based on the detected landmarks comprises estimating the mitral valve contours in each frame of each 2D CMR slice; and the step of reconstructing a 3D mitral valve model from the mitral valve contours in the 2D CMR slices using a trained regression model comprises:

for each of the plurality of cardiac phases, reconstructing a respective 3D mitral valve model from the estimated mitral valve contours in the corresponding frame of each of the 2D CMR slices using the trained regression function, resulting in a 4D dynamic mitral valve model.

33. The non-transitory computer readable medium of claim 28, wherein the step of detecting a set of mitral valve landmarks in each of the 2D CMR slices comprises:

detecting a posterior annulus (PA) landmark, a posterior free edge (PFE) landmark, an anterior annulus (AA) landmark, and an anterior free edge (AFE) landmark in each 2D CMR slice.

34. The non-transitory computer readable medium of claim 33, wherein the step of detecting a posterior annulus (PA) landmark, a posterior free edge (PFE) landmark, an anterior annulus (AA) landmark, and an anterior free edge (AFE) landmark in each 2D CMR slice comprises, in each 2D CMR slice:

independently detecting PA candidates, PFE candidates, AA candidates, and AFE candidates using respective trained landmark classifiers;

generating a plurality of joint context candidates, the plurality of joint context candidates corresponding to all possible combinations of the PA, PFE, AA, and AFE candidates; and selecting one of the joint context candidates using a trained joint context classifier.

35. The non-transitory computer readable medium of claim 33, wherein the step of estimating mitral valve contours in each of the 2D CMR slices based on the detected landmarks comprises, in each 2D CMR slice:

initializing a posterior leaflet contour as a number discrete contour points in a straight line between the detected PA and PFE landmarks;

initializing an anterior leaflet contour as a number of discrete contour points in a straight line between the detected AA and AFE landmarks; and deforming the posterior leaflet contour and the anterior leaflet contour by adjusting the contour points of the posterior leaflet contour and the anterior leaflet contour in normal directions using a trained 2D contour detector.

36. The non-transitory computer readable medium of claim 28, wherein the step of reconstructing a 3D mitral valve model from the mitral valve contours in the 2D CMR slices using a trained regression model comprises:

calculating shape descriptors from the detected mitral valve landmarks and the estimated contours in the 2D CMR slices; and reconstructing the 3D mitral valve by the trained regression model based on the calculated shape descriptors.

37. The non-transitory computer readable medium of claim 28, wherein the 3D mitral valve model reconstructed using the trained regression model comprises a set of points defining a surface of the mitral valve, and the method further comprises:

refining the 3D mitral valve model reconstructed using the trained regression model to fit a mesh to fit a mesh to the set of points defining the surface of the mitral valve.

* * * * *